United States Patent
Inami (10) Patent No.: US 8,676,246 B2
(45) Date of Patent: Mar. 18, 2014

(54) INFORMATION COMMUNICATION TERMINAL PROVIDED WITH SECURITY CONTROL FUNCTION, COMMUNICATION SYSTEM, AND COMMUNICATION METHOD PERFORMED BY THE TERMINAL

(75) Inventor: Satoshi Inami, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/578,909

(22) PCT Filed: Jan. 25, 2012

(86) PCT No.: PCT/JP2012/000451
§ 371 (c)(1),
(2), (4) Date: Aug. 14, 2012

(87) PCT Pub. No.: WO2012/132174
PCT Pub. Date: Oct. 4, 2012

(65) Prior Publication Data
US 2013/0029689 A1    Jan. 31, 2013

(30) Foreign Application Priority Data
Mar. 25, 2011   (JP) .................................. 2011-068856

(51) Int. Cl.
H04W 24/00    (2009.01)
H04B 7/00     (2006.01)
H04B 7/185    (2006.01)

(52) U.S. Cl.
USPC ..................... 455/522; 455/456.1; 455/456.4; 455/13.4

(58) Field of Classification Search
CPC ... H04M 11/00; H04M 1/00; H04M 1/72572; H04M 1/72577; H04M 2250/10; H04W 12/08; H04W 52/28; H04W 64/00
USPC ........................... 455/456.1, 456.4, 13.4, 522
See application file for complete search history.

(56) References Cited

U.S. PATENT DOCUMENTS

2003/0061166 A1   3/2003   Saito et al.
2005/0059388 A1   3/2005   Haines et al.
(Continued)

FOREIGN PATENT DOCUMENTS

JP   2003-99400    4/2003
JP   2004-247819   9/2004
(Continued)

OTHER PUBLICATIONS

International Search Report issued Apr. 3, 2012 in corresponding International Application No. PCT/JP2012/000451.

Primary Examiner — Opiribo Georgewill
(74) Attorney, Agent, or Firm — Wenderoth, Lind & Ponack, L.L.P.

(57) ABSTRACT

A position information obtaining section 102 obtains position information indicating the current position of an information communication terminal 100. A safety area storing section 103 stores in advance a safety area considered as being safe because the security risk such as information leak is low. A safety determination section 104 determines, based on the position information and the safety area, the security risk of wireless communication performed by the information communication terminal 100 at the current position. The communication control section 105 controls a wireless communication section 106 so as to transmit a radio signal at a larger radio wave intensity when the safety determination section 104 has determined that the risk is low, and to transmit a radio signal at a smaller radio wave intensity when the safety determination section 104 has determined that the risk is high.

10 Claims, 9 Drawing Sheets (56) References Cited

U.S. PATENT DOCUMENTS

| | | |
|---|---|---|
| 2006/0003815 A1 | 1/2006 | Itoh et al. |
| 2006/0239217 A1 | 10/2006 | Hassan et al. |
| 2007/0191043 A1* | 8/2007 | Shapira et al. ............... 455/522 |
| 2007/0200674 A1* | 8/2007 | Moore et al. ................. 340/5.74 |
| 2008/0133791 A1* | 6/2008 | Hodges et al. ................. 710/33 |
| 2008/0201783 A1* | 8/2008 | Tamai ............................ 726/28 |
| 2009/0241167 A1* | 9/2009 | Moore ............................. 726/1 |

FOREIGN PATENT DOCUMENTS

| | | |
|---|---|---|
| JP | 2005-57773 | 3/2005 |
| JP | 2006-20259 | 1/2006 |
| JP | 2006-244381 | 9/2006 |
| JP | 2008-17302 | 1/2008 |
| JP | 2008-538684 | 10/2008 |

* cited by examiner

| OBTAINMENT TIME | CURRENT POSITION (LATITUDE, LONGITUDE) |
|---|---|
| 2011/2/10 14:00 | (+34.44.36.02, +135.26.44.35) |

| CENTER OF SAFETY AREA (LATITUDE, LONGITUDE) | RADIUS |
|---|---|
| (+34.39.55.16, +135.30.18.98) | 30 m |

(b)

| DIAGONAL VERTICES OF RECTANGLE | COORDINATES (LATITUDE, LONGITUDE) |
|---|---|
| (N1, E1) | (+34.39.55.16, +135.30.28.98) |
| (N2, E2) | (+34.39.55.20, +135.30.18.98) |

| RECEPTION TIME | CURRENT POSITION (LATITUDE, LONGITUDE) |
|---|---|
| 2011/2/14 14:00 | (+34.44.36.00, +135.26.44.30) |

INFORMATION COMMUNICATION TERMINAL PROVIDED WITH SECURITY CONTROL FUNCTION, COMMUNICATION SYSTEM, AND COMMUNICATION METHOD PERFORMED BY THE TERMINAL

TECHNICAL FIELD

The present invention relates to information communication terminals provided with security control functions, and more specifically, to information communication terminals configured to control a radio wave intensity by using position information in order to improve security of communication performed between the information communication terminals, a communication system including a plurality of the information communication terminals, and a communication method performed by the information communication terminals.

BACKGROUND ART

In recent years, more people own a plurality of information communication terminals that can execute applications, such as desktop personal computer (hereinafter, referred to as PC), notebook PC, tablet PC, PDA (personal digital assistant), mobile phone, smartphone, and the like, and use a plurality of information communication terminals differently in accordance with situations. Moreover, progress of hardware installed in these information communication terminals has been remarkable. For example, an information communication terminal includes a CPU (central processing unit) having a gigahertz-class clock frequency, and has a plurality of communication means such as public circuit, wireless LAN, (Local Area Network), Bluetooth®, and the like. Accordingly, Web sites made for PCs have been increasingly browsed at various locations, by means of not only PCs but also smartphones. Thus, there is a demand for a seamless terminal transfer in which, when a plurality of information communication terminals to be used are switched, an application, such as a browser, being used in an information communication terminal which is a transfer source can be continuously used in an information communication terminal which is a transfer destination.

On the other hand, there are many cases where data handled by smartphones and the like is personal information. For example, many people visit shopping sites by using browsers and input personal information such as address, credit card number, and the like. In addition, an access history by use of a browser and bookmark information are privacy-related data, and thus, people may not want such information to be viewed by others. That is, when such information is relayed between information communication terminals, it is necessary to pay utmost attention so as to prevent such information from leaking and being misused.

Further, smartphones are easy to carry and used at various locations. Therefore, if a GPS (Global Positioning System) is installed in a smartphone, it is possible to correctly identify the position at which the smartphone is used. By using this position information, it is possible to improve not only convenience but also security at the time when privacy-related data is communicated.

An example of a conventional technology that improves security during communication by using position information of an information communication terminal is the technology disclosed in Patent Literature 1. According to the technology disclosed in Patent Literature 1, information of the location and time at which electronic commerce is to be performed is registered in a server in advance. Then, when performing electronic commerce by accessing a server, an information communication terminal obtains the current location and time and transmits them as authentication information to the server. Only when the information registered in advance coincides with the transmitted information, the server allows electronic commerce. In this manner, the technology disclosed in Patent Literature 1 enhances the security during communication.

CITATION LIST

Patent Literature

[PTL 1] Japanese Laid-Open Patent Publication No. 2006-244381

SUMMARY OF THE INVENTION

Problems to be Solved by the Invention

According to the above conventional technology, by registering, in a server, position information of an information communication terminal used when performing communication with the server, the accuracy of an authentication process regarding the information communication terminal is improved, and the security of communication between the information communication terminal and the server can be enhanced. However, although the information communication terminal is a portable device that can be carried around, the server is, in a common understanding, not an apparatus that can be carried around and is fixed to a certain place. That is, the above conventional technology is not a technology made in consideration of solving security problems characteristic to communications between information communication terminals that can both be carried around.

For example, in a relatively large house, a radio wave containing information does not leak to the outside of the house. However, in a small house, a radio wave containing information leaks to the outside of the house, and the possibility of the information being stolen by another person is increased. Further, in a public place such as in a train, since there are many people having multiple terminals nearby, an information leak risk of the information being stolen is further increased. That is, although the information leak risk at the time when performing communication between information communication terminals changes depending on the location, a communication method cannot, conventionally, be changed in accordance with the change of the information leak risk, and the security cannot be improved.

Therefore, an object of the present invention is to provide a security control device that can determine, when communication is performed between information communication terminals, a security risk based on position information of a terminal, and change the communication method in accordance with the determination, thereby ensuring security and improving communication efficiency and convenience between the information communication terminals; a communication system; and a communication method performed by the terminals.

Solution to the Problems

The present invention is directed to an information communication terminal configured to perform wireless communication using short distance communication. In order to attain the above object, the information communication terminal of the present invention includes: a position information obtaining section configured to obtain position information of the information communication terminal; a safety area storing section configured to store a safety area registered as being safe when the information communication terminal performs communication with another terminal; a safety determination section configured to determine, based on the position information of the information communication terminal and the safety area, a security risk at the time when the information communication terminal performs communication with the another terminal; and a communication section configured to perform, when the safety determination section has determined that the security risk during communication is high, data communication with the another terminal at a predetermined smaller radio wave intensity, and perform, when the safety determination section has determined that the security risk during communication is low, data communication with the another terminal at a predetermined larger radio wave intensity.

Typically, the safety area is inputted by the user through an input section through which the user inputs an instruction. Alternatively, the safety area may be determined by the position information obtaining section based on a history of a plurality of pieces of position information that have been obtained.

Preferably, when the position information obtaining section has failed to obtain the position information of the information communication terminal, the safety determination section determines that the security risk during communication is high. Further, the safety determination section determines the security risk during communication, depending on whether a current position of the information communication terminal obtained from the position information is present within the safety area. At this time, the safety determination section may determine the security risk during communication, further based on information obtainment time obtained from the position information.

It should be noted that, preferably, when the communication section can obtain position information of the another terminal, the safety determination section determines, further based on the position information of the another terminal, the security risk at the time when the information communication terminal performs communication with the another terminal. Further, in this case, at a timing when the distance between the information communication terminal and the another terminal has become a distance that allows communication at a radio wave intensity determined based on the determination by the safety determination section, the communication section can start data communication.

Advantageous Effects of the Invention

According to the present invention, when the risk determined based on the position information of the terminal is high, the security can be increased even by decreasing the communication ability, and when the risk determined based on the position information of the terminal is low, the communication ability can also be increased with the security being ensured. Accordingly, the communication ability and the security can be optimally controlled.

DESCRIPTION OF EMBODIMENTS

Hereinafter an embodiment of the present invention will be described with reference to the drawings.

In the present invention, a situation is assumed where, when a user switches an information communication terminal being used by the user (hereinafter, referred to as transfer source terminal) to another terminal (hereinafter, referred to as transfer destination terminal), the user is to continuously use the application having been used in the transfer source terminal, also in the transfer destination terminal. In such a situation, information such as operation contents performed onto the application in the transfer source terminal is transmitted to the transfer destination terminal. As a result, the operation contents and the like of the application that the user was using in the transfer source terminal before the switch is reproduced and displayed on the screen of the transfer destination terminal.

Figure 1:
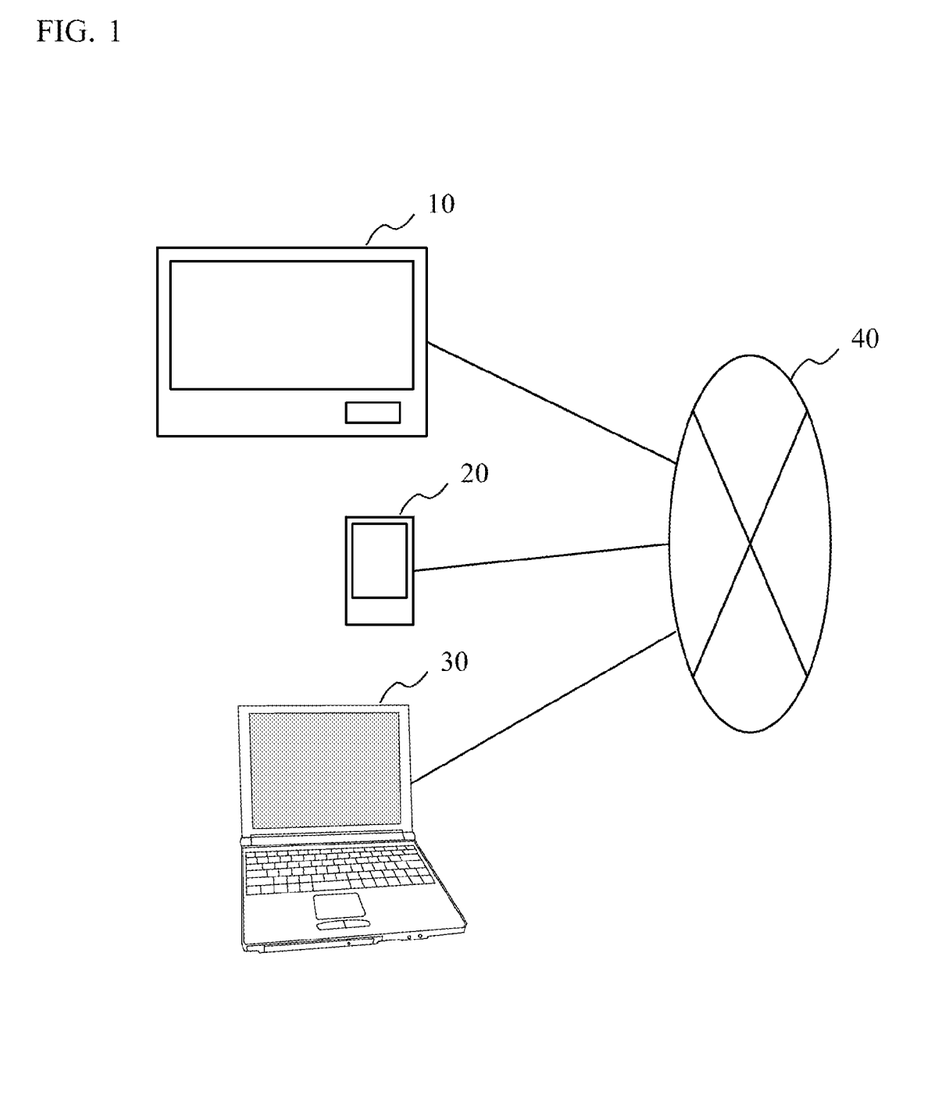
FIG. 1 shows an example of a configuration of a communication system including information communication terminals provided by the present invention.

FIG. 1 shows an example of a configuration of a communication system including an information communication terminal provided by the present invention. In the example of FIG. 1, one user owns a plurality of information communication terminals, that is, a tablet PC 10, a mobile phone 20, and a notebook PC 30, which are connectable to a network 40. The user uses these information communication terminals differently in accordance with situations. For example, the user uses the notebook PC 30 in his or her house, and uses the tablet PC 10 or the mobile phone 20 when the user is out. In such a communication system, it is conceivable that, for example, the user was viewing internet news on a Web site on the notebook PC 30 in the house, but since the time for going out has come, the user views a continuation of the news on the mobile phone 20. Meanwhile, it is also conceivable that, for example, although the user was viewing internet news on a Web site on the mobile phone 20 while standing in a train while the user was out, a seat became available, and the user has taken the seat and thus views a continuation of the news on the tablet PC 10 having a big screen, by switching the mobile phone 20 to the tablet PC 10.

Figure 2:
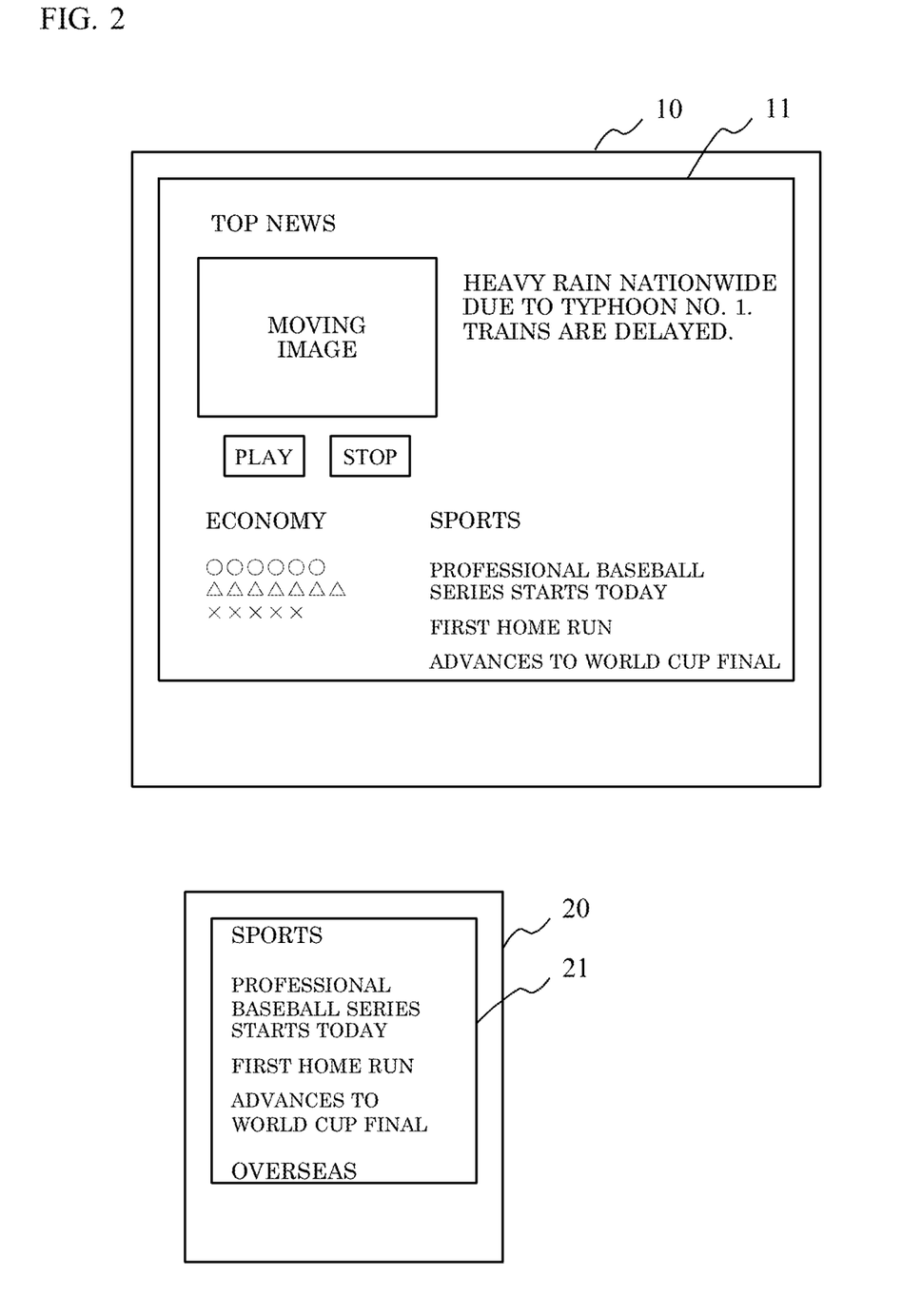
FIG. 2 shows an example of a display screen 11 of a tablet PC 10 and a display screen 21 of a mobile phone 20.

An example of display screens of the tablet PC 10 and the mobile phone 20 when viewing internet news is shown in FIG. 2. FIG. 2 shows an example of a display screen 11 of the tablet PC 10 and a display screen 21 of the mobile phone 20.

The tablet PC 10 and the mobile phone 20 of the present embodiment are each provided with a communication function for connecting to a network, and a part of a Web site obtained by the communication function is being displayed on each of the display screens 11 and 21. It should be noted that switching from the mobile phone 20 to the tablet PC 10 may be performed in accordance with an instruction through a physical button or a software key provided in the mobile phone 20 being a transfer source terminal, or may be automatically performed by a predetermined status change being detected.

With respect to the usage described above, the switching direction may be in the reverse, of course. That is, each of the information communication terminals such as the tablet PC 10, the mobile phone 20, and the notebook PC 30 can be either of a transfer source terminal or a transfer destination terminal.

In each embodiment of the present invention, a configuration of an information communication terminal which can be at least a transfer source terminal, and processes performed by the information communication terminal will be described in detail.

<First Embodiment>

Figure 3:
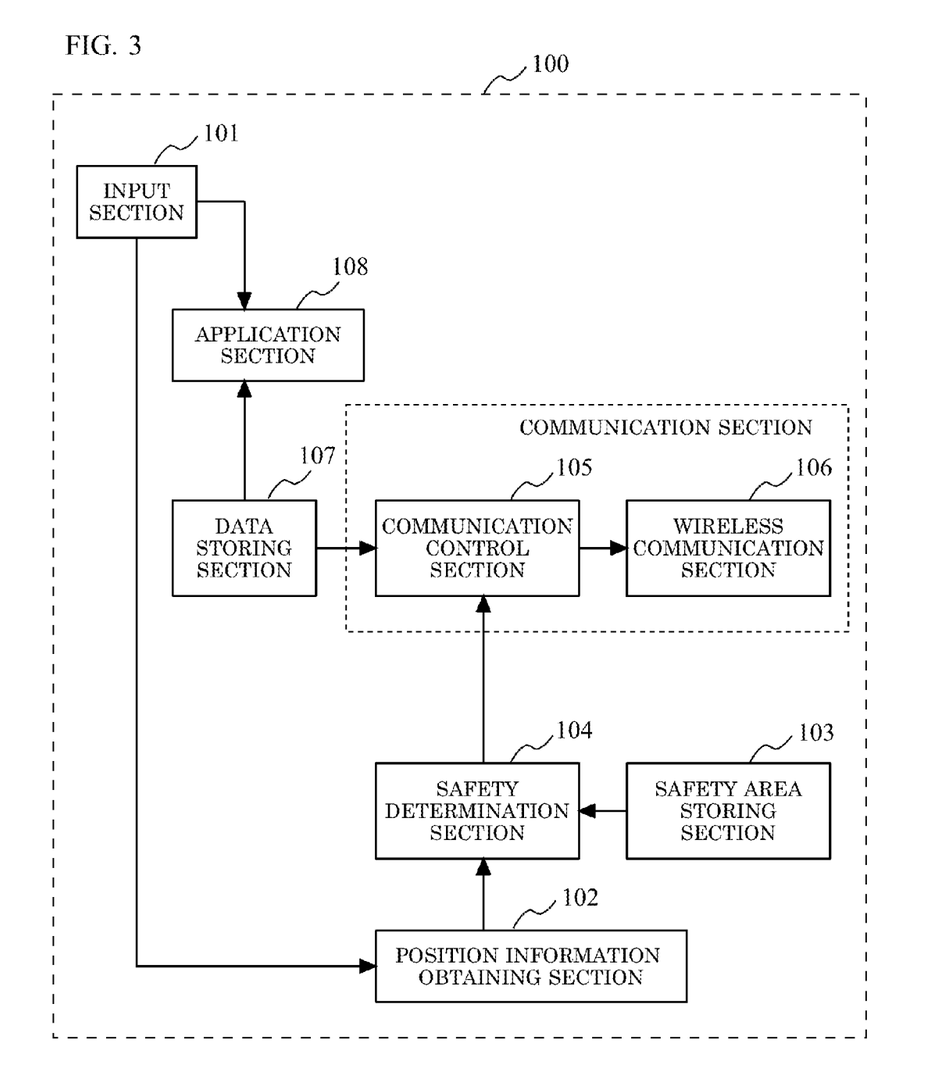
FIG. 3 shows an example of a configuration of an information communication terminal 100 according to a first embodiment of the present invention.

FIG. 3 shows an example of a configuration of an information communication terminal 100 according to a first embodiment of the present invention. The information communication terminal 100 according to the first embodiment shown in FIG. 3 includes an input section 101, a position information obtaining section 102, a safety area storing section 103, a safety determination section 104, a communication control section 105, a wireless communication section 106, a data storing section 107, and an application section 108.

The input section 101 is an interface, such as a keypad and a touch panel, through which a user inputs an instruction (request to start communication, information registration, and the like) to the information communication terminal 100. The user instruction inputted to the input section 101 is outputted to the position information obtaining section 102 and the application section 108.

The position information obtaining section 102 obtains position information indicating the current position of the information communication terminal 100. Typically, the position information obtaining section 102 obtains the position information by receiving GPS information. Alternatively, the position information obtaining section 102 may estimate a current position based on a MAC (Media Access Control) address and a radio wave intensity received from a WiFi (Wireless Fidelity) access point, and may obtain the estimated current position as the position information. Still alternatively, the position information obtaining section 102 may estimate a current position from a radio wave received from a mobile phone base station, and may obtain the estimated current position as the position information. Still alternatively, the position information obtaining section 102 may estimate a current position from an IP (Internet Protocol) address or the like designated on the network, and may obtain the estimated current position as the position information.

Figure 4:
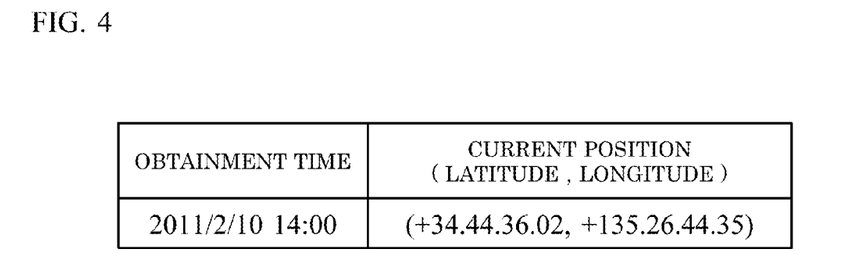
FIG. 4 shows an example of position information obtained by a position information obtaining section 102.

FIG. 4 shows an example of position information obtained by the position information obtaining section 102. With reference to the example in FIG. 4, the obtainment time at which GPS information was received (Feb. 10, 14:00, 2011), and the latitude (north latitude: 34 degrees, 44 minutes, and 36.02 seconds) and the longitude (east longitude: 135 degrees, 26 minutes, and 44.35 seconds) of the current position of the information communication terminal 100 are used as the position information.

The safety area storing section 103 is a memory for storing in advance a safety area which is registered as being safe, because in which safety area, when the information communication terminal 100 being used is to be switched, even if necessary information is transmitted via wireless communication from the transfer source terminal to the transfer destination terminal, a security risk such as information leak is low. As the safety area storing section 103, a non-volatile flash memory is preferable. However, as long as the safety area is set every time the information communication terminal 100 is activated, a volatile memory may be used. The safety area may be set manually by the user, or may be automatically set by the information communication terminal 100. In the latter case, it is conceivable that, for example, the information communication terminal 100 extracts, based on a movement history, a location where the information communication terminal 100 is relatively often present, and sets the extracted location or a neighborhood thereof as the safety area. Alternatively, the safety area storing section 103 may set in advance a rule that the safety area should satisfy, such as "position at which GPS information can be detected".

Figure 5:
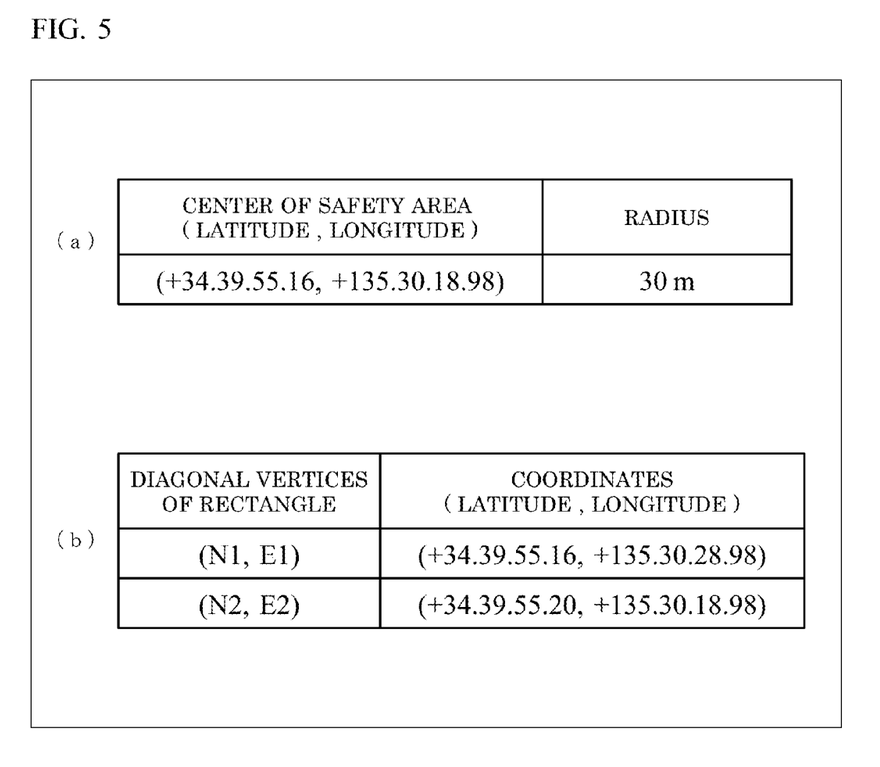
FIG. 5 shows an example of a safety area stored in a safety area storing section 103.

FIG. 5 shows an example of a safety area stored in the safety area storing section 103. In the example of FIG. 5(a), an area having a radius of 30 meters about the position of 34 degrees, 39 minutes, and 55.16 seconds in the north latitude, and 135 degrees, 30 minutes, and 18.98 seconds in the east longitude is used as the safety area. In the example of FIG. 5(b), a rectangle area having diagonal vertices at the position of a north latitude N1 and an east longitude E1, and the position of a north latitude N2 and an east longitude E2 is used as the safety area. Although the safety areas shown in the examples in FIG. 5 have simple shapes such as a circle or a rectangle, an area having a complicated shape other than these shapes may be used as the safety area.

The safety determination section 104 receives the position information obtained by the position information obtaining section 102 and the safety area stored in the safety area storing section 103, and determines a security risk in wireless communication performed by the information communication terminal 100. Specifically, when the information communication terminal 100 (transfer source terminal) is present within the safety area, the safety determination section 104 determines that even if the information communication terminal 100 performs, at the current position, wireless communication with another neighboring information communication terminal (transfer destination terminal), it is safe because the security risk is low. On the other hand, when the information communication terminal 100 is not present within the safety area, the safety determination section 104 determines that if the information communication terminal 100 performs, at the current position, wireless communication with another neighboring information communication terminal, it is dangerous because the security risk is high.

Based on the result determined by the safety determination section 104, the communication control section 105 controls the radio wave intensity of a radio signal to be transmitted by the wireless communication section 106. Specifically, when the determination result by the safety determination section 104 is "safe", the communication control section 105 instructs the wireless communication section 106 to increase the radio wave intensity of the radio signal, and when the determination result by the safety determination section 104 is "dangerous", the communication control section 105 instructs the wireless communication section 106 to decrease the radio wave intensity of the radio signal.

The wireless communication section 106 is an interface for performing wireless communication with another information communication terminal. The wireless communication section 106 may be any interface that can transmit and receive a radio signal to and from another information communication terminal present at a short distance therefrom, and for example, WiFi, Bluetooth, or the like can be used. The wireless communication section 106 forms, along with the communication control section 105 described above, a communication section of the information communication terminal 100.

The data storing section 107 is a memory for storing data to be transmitted by the information communication terminal 100 when the information communication terminal 100 performs wireless communication with another information communication terminal present at a short distance therefrom. In the present invention, it is assumed that data stored in the data storing section 107 includes personal information and the like which require security. A flash memory, a DRAM (Dynamic Random Access Memory), or the like is used as the data storing section 107.

The application section 108 is an application that uses data stored in the data storing section 107, and is a Web browser, for example. In general, the application section 108 is stored in a ROM (Read Only Memory) included in the information communication terminal 100, is read from the ROM when necessary, and executed by use of the CPU and a RAM (Random Access Memory). It should be noted that in the configuration of the information communication terminal 100 shown in FIG. 3, the CPU, the RAM, and the ROM are omitted.

Next, steps of wireless communication performed by the information communication terminal 100 according to the first embodiment having the above-described configuration with another information communication terminal present at a short distance will be described further with reference to FIG. 6.

Figure 6:
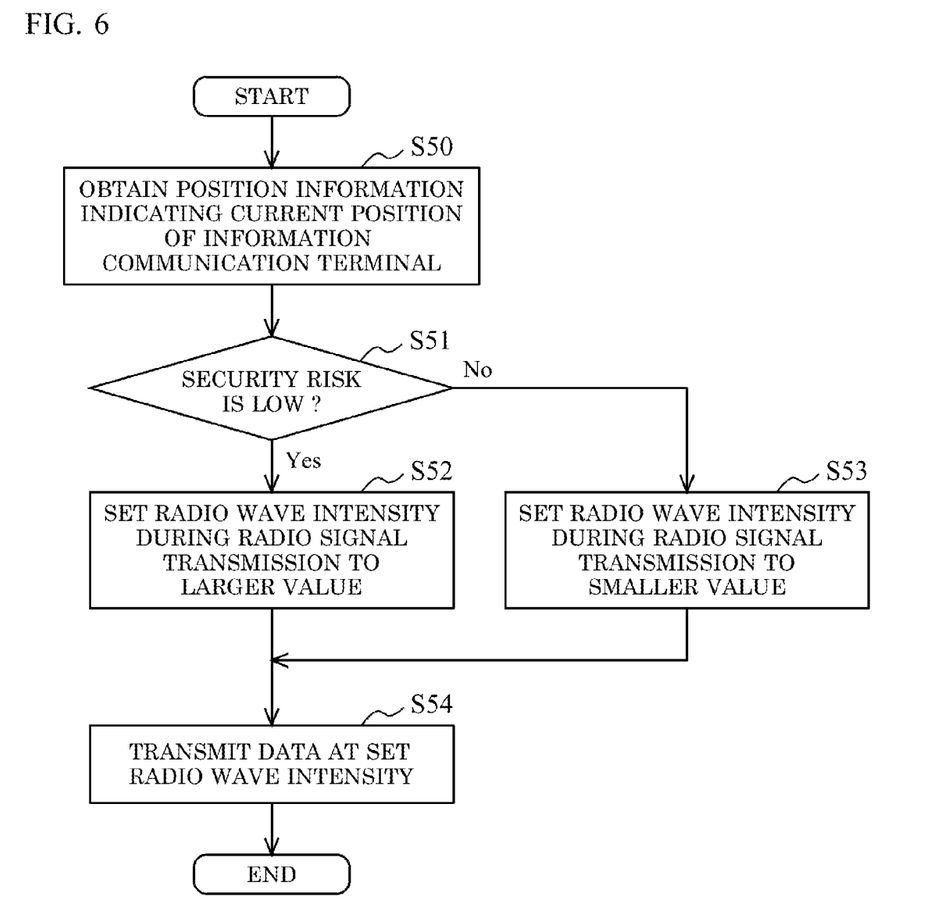
FIG. 6 is a flow chart showing process steps of a radio wave intensity control performed by the information communication terminal 100 according to the first embodiment of the present invention.

FIG. 6 is a flow chart showing process steps of a radio wave intensity control performed by the information communication terminal 100 according to the first embodiment of the present invention. It should be noted that a safety area is stored in advance in the safety area storing section 103, as described above.

The process shown in FIG. 6 is started by the input section 101 receiving an instruction to start communication from a user. The input section 101 having received an instruction to start communication from the user notifies the position information obtaining section 102 of a position information obtaining request. Upon receiving the notification, the position information obtaining section 102 obtains position information indicating the current position of the information communication terminal 100 (step S50). The obtained position information is outputted to the safety determination section 104.

The safety determination section 104 obtains the position information from the position information obtaining section 102 and the safety area from the safety area storing section 103, and determines whether the security risk is low or high, based on whether the information communication terminal 100 is present within the safety area (step S51). When determining that the information communication terminal 100 is present within the safety area (step S51, Yes), the safety determination section 104 notifies the communication control section 105 of a determination that even if the information communication terminal 100 performs, at the current position, wireless communication with another information communication terminal, it is safe because the security risk is low. On the other hand, when determining that the information communication terminal 100 is not present within the safety area (step S51, No), the safety determination section 104 notifies the communication control section 105 of a determination that if the information communication terminal 100 performs, at the current position, wireless communication with another information communication terminal, it is dangerous because the security risk is high.

Whether the position of the information communication terminal 100 is within the safety area is determined by the safety determination section 104 in the following manner, for example.

When the safety area is stored as a circular area as in the case of FIG. 5(*a*), a distance D between the center of the safety area and the current position of the information communication terminal 100 is determined, and the distance D is compared with the radius r of the safety area. If the distance D≤the radius r is satisfied, it is determined that the information communication terminal 100 is present within the safety area. It should be noted that although the earth is a sphere, a meridian between two points that are very close to each other can be regarded as a straight line, and thus, the distance D can be determined by approximate calculation using a simple trigonometric function.

Further, when the safety area is stored as a rectangular area as in the case of FIG. 5(*b*), a latitude N of the information communication terminal 100 is compared with each of the values of the north latitudes N1 and the N2, and a longitude E of the information communication terminal 100 is compared with each of the values of the east longitudes E1 and E2. If the north latitude N1≤the latitude N≤the north latitude N2, and the east longitude E1≤the longitude E≤the east longitude E2 are satisfied, it is determined that the information communication terminal 100 is present within the safety area.

When receiving, from the safety determination section 104, a notification that it is safe because the security risk is low, the communication control section 105 issues an instruction, to the wireless communication section 106, to set the radio wave intensity used when transmitting a radio signal to a larger value that has been set in advance (step S52). On the other hand, when receiving, from the safety determination section 104, a notification that it is dangerous because the security risk is high, the communication control section 105 issues an instruction, to the wireless communication section 106, to set the radio wave intensity used when transmitting a radio signal to a smaller value that has been set in advance (step S53). Then, the communication control section 105 obtains, from the data storing section 107, data to be transmitted through wireless communication, and transmits, through the wireless communication section 106, the obtained data to another information communication terminal, in a radio signal having the radio wave intensity set in step S52 or step S53 (step S54).

As described above, in the information communication terminal 100 according to the first embodiment of the present invention, when the own terminal (transfer source terminal) is present in the safety area set in advance, wireless communication is performed with another information communication terminal (transfer destination terminal), by using a radio signal having a larger radio wave intensity, and when the own terminal is not present in the safety area set in advance, wireless communication is performed with another information communication terminal, by using a radio signal having a smaller radio wave intensity. Accordingly, it is possible to perform control, such that, when the security risk determined based on the position information of the information communication terminal is high, the safety is prioritized to be increased even by decreasing the communication ability, and when the security risk determined based on the position information of the information communication terminal is low, communication is allowed to be performed with another terminal, with increased communication ability while a certain level of safety being maintained. Accordingly, it is possible to improve the communication efficiency and convenience between information communication terminals while maintaining the security.

<Second Embodiment>

Figure 7:
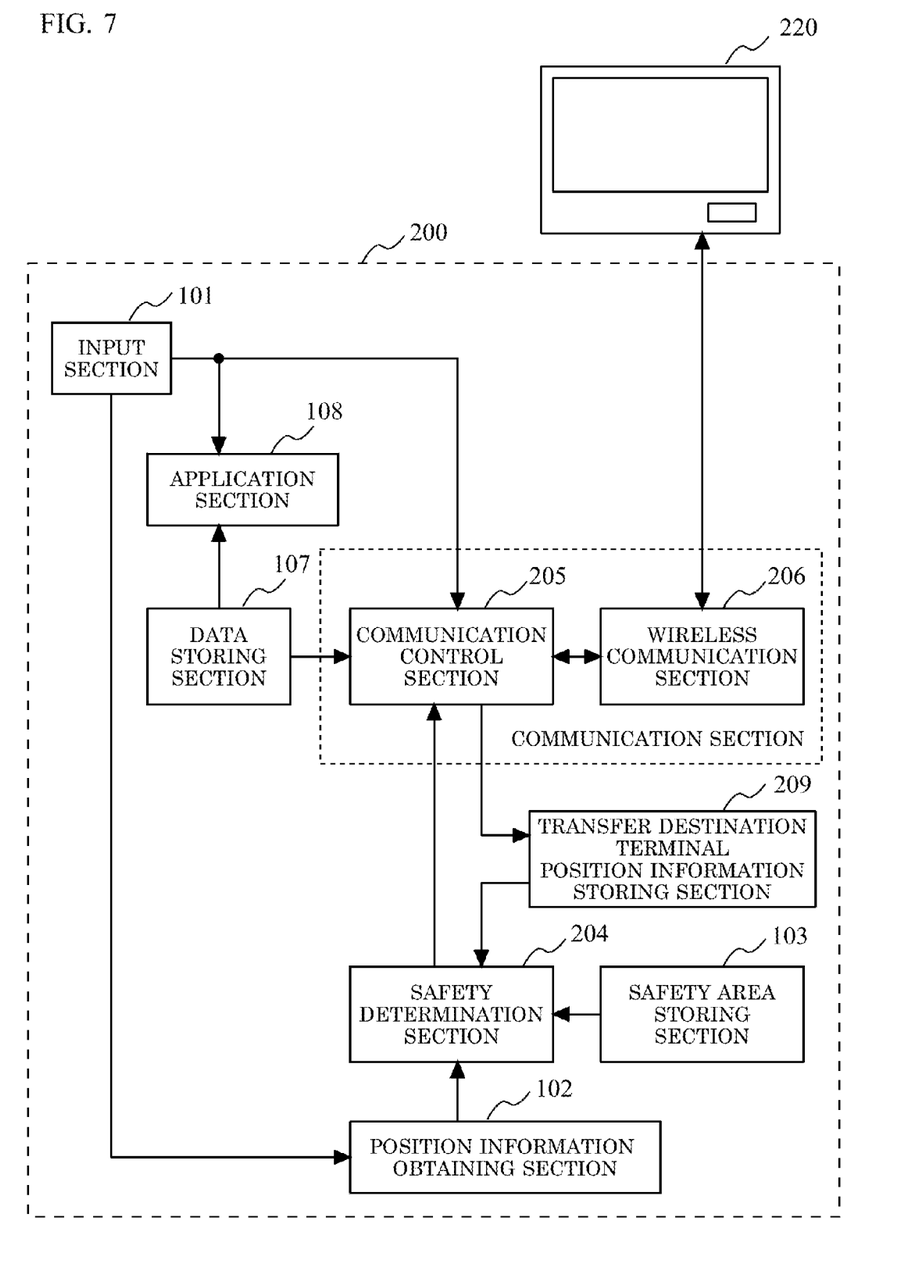
FIG. 7 shows an example of a configuration of an information communication terminal 200 according to a second embodiment of the present invention.

FIG. 7 shows an example of a configuration of an information communication terminal 200 according to a second embodiment of the present invention. The information communication terminal 200 according to the second embodiment shown in FIG. 7 includes the input section 101, the position information obtaining section 102, the safety area storing section 103, a safety determination section 204, a communication control section 205, a wireless communication section 206, the data storing section 107, the application section 108, and a transfer destination terminal position information storing section 209. As shown in FIG. 7, the information communication terminal 200 according to the second embodiment is different from the information communication terminal 100 (FIG. 3) according to the first embodiment, in terms of the configurations of the safety determination section 204, the communication control section 205, the wireless communication section 206, and the transfer destination terminal position information storing section 209.

Figure 8:
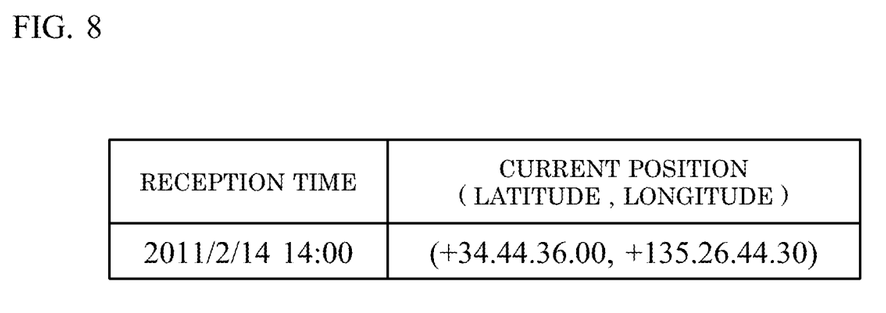
FIG. 8 shows an example of position information of a transfer destination terminal, stored in a transfer destination terminal position information storing section 209.

The transfer destination terminal position information storing section 209 is a memory for storing position information indicating the current position of a transfer destination terminal 220, which serves as another information communication terminal to which the data stored in the data storing section 107 is to be transmitted. FIG. 8 shows an example of position information of a transfer destination terminal stored in the transfer destination terminal position information storing section 209. In the example of FIG. 8, the reception time (Feb. 14, 14:00, 2011), and the latitude (north latitude: 34 degrees, 44 minutes, and 36.00 seconds) and the longitude (east longitude: 135 degrees, 26 minutes, and 44.30 seconds) of the current position of the transfer destination terminal are stored as the position information. It should be noted that the position information to be stored may be any information that can specify the position of the transfer destination terminal 220, and may be indicated by relative coordinates or the like with the information communication terminal 200, instead of absolute coordinates.

The safety determination section 204, the communication control section 205, and the wireless communication section 206 of the second embodiment differ from the safety determination section 104, the communication control section 105, and the wireless communication section 106 of the first embodiment in that a process for storing position information of the transfer destination terminal, and a process of safety determination using the position information of the transfer destination terminal are further performed. It should be noted that the communication control section 205 and the wireless communication section 206 form a communication section of the information communication terminal 200.

Hereinafter, the information communication terminal 200 according to the second embodiment will be described, focusing on the above different features thereof. The same components as those of the information communication terminal 100 according to the first embodiment are denoted by the same reference characters, and description thereof will be omitted.

Figure 9:
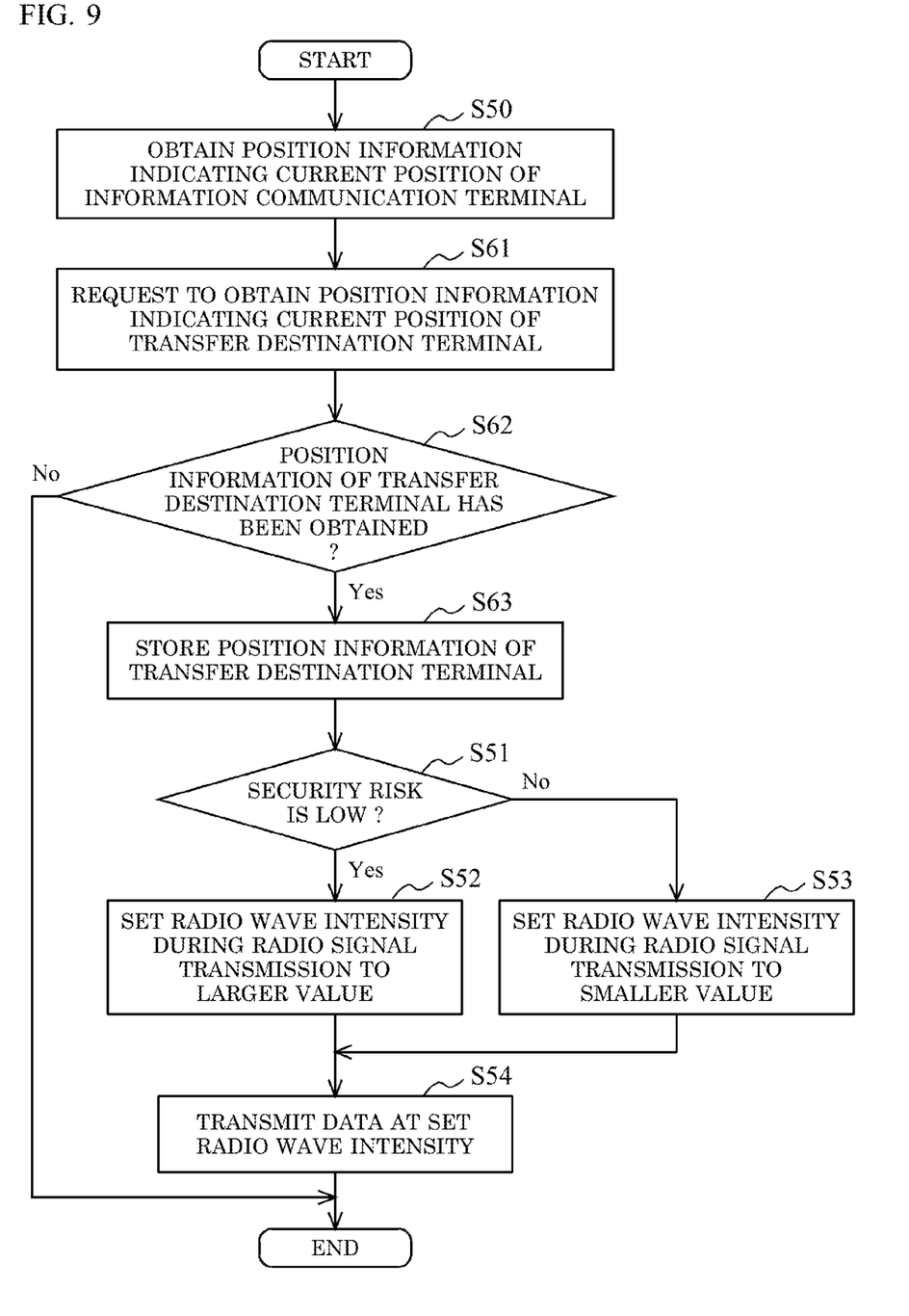
FIG. 9 is a flow chart showing process steps of a radio wave intensity control performed by the information communication terminal 200 according to the second embodiment of the present invention.

FIG. 9 is a flow chart showing process steps of a radio wave intensity control performed by the information communication terminal 200 according to the second embodiment of the present invention. It should be noted that the safety area is stored in advance in the safety area storing section 103 as described above.

The process shown in FIG. 9 is started by the input section 101 receiving an instruction to start communication from a user. The input section 101 having received an instruction to start communication from the user notifies the position information obtaining section 102 of a position information obtaining request. Upon receiving the notification, the position information obtaining section 102 obtains position information indicating the current position of the information communication terminal 100 (step S50). The obtained position information is outputted to the safety determination section 204. Concurrently, the input section 101 notifies the communication control section 205 of a position information obtaining request regarding the transfer destination terminal. Upon receiving the notification, the communication control section 205 searches for the transfer destination terminal 220 through the wireless communication section 206, and requests the found transfer destination terminal 220 to notify the communication control section 205 of position information (step S61).

When having able to receive a response to this request from the transfer destination terminal 220 through the wireless communication section 206 and to obtain the position information of the transfer destination terminal (step S62, Yes), the communication control section 205 stores the position information of the transfer destination terminal in the transfer destination terminal position information storing section 209 (step S63). On the other hand, when not having able to obtain the position information of the transfer destination terminal even after having waited for a certain period (step S62, No), the communication control section 205 determines that the transfer destination terminal is in a state where it cannot perform communication, and ends the process.

Upon the position information of the transfer destination terminal being stored, the safety determination section 204 obtains the position information from the position information obtaining section 102, the safety area from the safety area storing section 103, the position information of the transfer destination terminal from the transfer destination terminal position information storing section 209, and determines whether the security risk is high or low based on these pieces of information and the area (step S51). For example, if both of the current position of the information communication terminal 200 and the current position of the transfer destination terminal 220 are present within the safety area, the safety determination section 204 notifies the communication control section 205 of a determination that even if wireless communication is performed between the terminals, it is safe because the security risk is low (step S51, Yes). On the other hand, if neither of the current position of the information communication terminal 200 nor the current position of the transfer destination terminal 220 are present within the safety area, the safety determination section 204 notifies the communication control section 205 of a determination that if wireless communication is performed between the terminals, it is dangerous because the security risk is high (step S51, No). It should be noted that, in a case where only one of the terminals is present within the safety area, a process of determining the security risk as being medium and setting the radio wave intensity to a medium value may be performed.

When receiving, from the safety determination section 204, a notification that it is safe because the security risk is low, the communication control section 205 issues an instruction, to the wireless communication section 206, to set the radio wave intensity used when transmitting a radio signal to a larger value that has been set in advance (step S52). On the other hand, when receiving, from the safety determination section 204, a notification that it is dangerous because the security risk is high, the communication control section 205 issues an instruction, to the wireless communication section 206, to set the radio wave intensity used when transmitting a radio signal to a smaller value that has been set in advance (step S53). Then, the communication control section 205 obtains, from the data storing section 107, data to be transmitted through wireless communication, and transmits, through the wireless communication section 206, the obtained data to the transfer destination terminal 220, in a radio signal having the radio wave intensity set in step S52 or step S53 (step S54).

As described above, in the information communication terminal 200 according to the second embodiment of the present invention, the radio wave intensity of a radio signal is set, by judging, in addition to the current position of the own terminal (transfer source terminal), the current position of the another terminal (transfer destination terminal). Accordingly, it is possible to further improve the security in addition to the effects provided by the first embodiment.

In the above embodiments, the cases where the safety area is stored in advance in the safety area storing section 103 have been described. However, the safety area may not be stored in advance in each of the information communication terminals 100 and 200, and may be stored sequentially. For example, each of the information communication terminals 100 and 200 may always receive GPS information, may determine, based on the history of a plurality of pieces of position information that have been received, a specific area such as an area where the corresponding information communication terminal 100 or 200 frequently passes, and may register the determined specific area as the safety area in the safety area storing section 103. Through such a process, it is possible to eliminate the necessity for the user to explicitly register the safety area.

Further, in the above embodiments, description has been given of the cases where the current position of each of the information communication terminals 100 and 200 is detected by use of GPS information, or a MAC address and a radio wave intensity received from a WiFi access point, and the detected current position is compared with the safety area. However, there may be cases where the current positions of the information communication terminals 100 and 200 cannot be detected. Therefore, in such a case where there is no information to be compared with the safety area, it may be determined that the security risk is high and it is dangerous.

Further, in the above embodiments, description has been given of the cases where security risk determination is performed based on the current position and the safety area of each of the information communication terminals 100 and 200. However, security risk determination may be performed also based on the current time in addition to the current position. For example, even in the case of a place that has a big crowd during the daytime and that seems to have a high security risk, if the place has only a small number of people in the early morning and has a good commanding view, there may be situations where it can be determined that the security risk is relatively low. Therefore, in such a case, even if the information communication terminal 100 or 200 is not present within the safety area, if the current time is an early time in the morning, it is possible to determine that the security risk is low.

Further, in the above embodiments, description has been given of the cases where the radio wave intensity is controlled in two patterns, that is, large or small. However, a plurality of radio wave intensities may be used in accordance with the level of the security risk. In this case, by storing security risk levels associated with the respective plurality of safety areas, the safety area storing section 103 can manage such control.

Further, in the above embodiments, description has been given on the cases where communication between information communication terminals is started upon an operation performed by the user. However, in a case where one or both of the two information communication terminals for which switching is performed is(are) moving, communication may be automatically started if the distance between the two information communication terminals becomes smaller than a predetermined value. This predetermined value is, for example, a distance which allows data to reach the transfer destination terminal at a radio wave intensity appropriate for avoiding the risk, which has been determined by the communication control section 105 or 205.

<Specific Application Example of the Present Invention>

As described at the beginning, in a case where one user owns a plurality of information communication terminals, there may be a situation where the user wants the Web site that the user having been browsing on the tablet PC 10 while the user has been out, to be seamlessly switched to the notebook PC 30 in the user's house when the user returns home, such that the user can continuously browse the Web site. In such a situation, activation of the browser application, obtainment of HTML documents for displaying the Web site being browsed, and transfer data regarding the access history and the like need to be transmitted to the transfer destination terminal. Since transmission of such transfer data takes some time, it is preferable, for realization of seamless transition, that communication of transfer data is started in advance (hereinafter, referred to as "pre-fetch communication"). The technology provided by the present invention is applicable to this pre-fetch communication.

Figure 10:
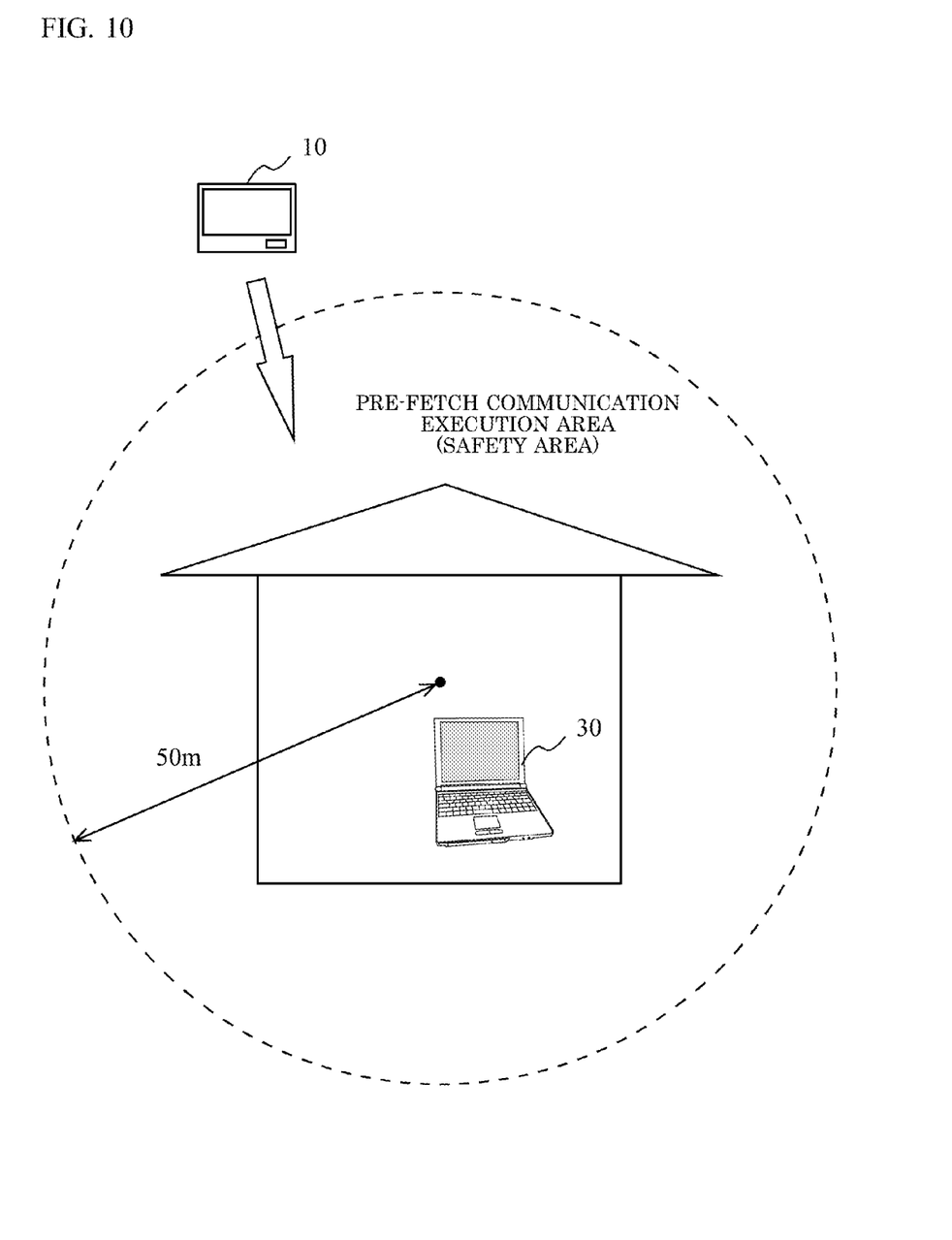
FIG. 10 illustrates a specific example to which the present invention is applied.

For example, an area having a radius 50 m around the user's house is defined as the safety area, and upon the tablet PC 10 being the transfer source terminal entering the safety area, the tablet PC 10 automatically starts pre-fetch communication with the notebook PC 30 in the house (FIG. 10). Alternatively, the safety area is provided in ranks, and while the tablet PC 10 is far from the house (radius 100 m), pre-fetch communication may be performed at a smaller radio wave intensity, and when the tablet PC 10 comes near the house (radius 20 m), pre-fetch communication may be performed at a larger radio wave intensity. By this process, all or most of the communication for the transfer is completed by the time the user reaches the house, and the user can immediately continue browsing the Web site. With respect to the distance at which the pre-fetch communication is started, a predetermined value may be determined that is sufficient for completing the pre-fetch process, based on the amount of data to be transferred, the communication speed, the movement speed of the terminal, and the like.

A part or the whole of the functional blocks forming the information communication terminal in each embodiment of the present invention is realized by using hardware resources such as a central processing unit (CPU), a storage device (memory (ROM, RAM, etc.), hard disk, etc.), and the input/output device, and typically implemented as an IC being an integrated circuit (also referred to as LSI, system LSI, super LSI, ultra LSI, etc.). These functional blocks may be implemented in individual chips, or a part or the whole of them may be implemented in one chip.

Further, the method for circuit integration is not limited to the IC, and may be realized by a dedicated circuit or a general-purpose processor. An FPGA (Field Programmable Gate Array) that can be programmed after manufacture of the IC or a reconfigurable processor that allows connections and settings of the circuit cells in the IC to be reconfigured may be used.

Still further, in a case where another circuit integration technology (such as biotechnology) replacing the IC becomes available as a result of improvement of a semiconductor technology or emergence of another technology derived therefrom, the functional blocks may be, of course, integrated using the technology The communication method performed by the information communication terminal in each embodiment of the present invention described above may be realized by the CPU interpreting and executing predetermined program data capable of executing the processes of the communication method stored in the storage device. In this case, the program data may be loaded onto the storage device via a storage medium such as a CD-ROM, a flexible disk, or the like, or may be directly executed on the storage medium. Here, the storage medium includes: a semiconductor memory such as a ROM, a RAM, and a flash memory; a magnetic disk memory such as a flexible disk, and a hard disk; an optical disk memory such as a CD-ROM, a DVD, and a BD; a memory card; and the like. Further, the storage medium is a notion including a communication medium such as a telephone line, a carrier path, and the like.

Industrial Applicability

The present invention can be used in an information communication terminal capable of executing applications, a system including the terminal, and the like. In particular, the present invention is useful in a case, for example, where it is desired to improve communication efficiency and convenience between information communication terminals, while maintaining the security.

Description Of The Reference Characters 10 tablet PC
11, 21 display screen
20 mobile phone
30 notebook PC
40 network
100, 200 information communication terminal
101 input section
102 position information obtaining section
103 safety area storing section
104, 204 safety determination section
105, 205 communication control section
106, 206 wireless communication section
107 data storing section
108 application
209 transfer destination terminal position information storing section
220 transfer destination terminal

The invention claimed is:

1. An information communication terminal configured to perform wireless communication using short distance communication, comprising:
   a position information obtaining section configured to obtain position information of the information communication terminal;
   a safety area storing section configured to store a safety area registered as being safe when the information communication terminal performs communication with another terminal;
   a safety determination section configured to determine, based on the position information of the information communication terminal and the safety area, a security risk at the time when the information communication terminal performs communication with the another terminal; and
   a communication section configured to perform, when the safety determination section has determined that the security risk during communication is high, data communication with the another terminal at a predetermined smaller radio wave intensity, and perform, when the safety determination section has determined that the security risk during communication is low, data communication with the another terminal at a predetermined larger radio wave intensity,
   wherein the safety determination section determines the security risk during communication, depending on whether a current position of the information communication terminal obtained from the position information is present within the safety area, and
   the safety determination section determines the security risk during communication, further based on information obtainment time obtained from the position information.

2. The information communication terminal according to claim 1, further comprising:
   an input section through which a user inputs an instruction, wherein
   the safety area is inputted by the user through the input section.

3. The information communication terminal according to claim 1, wherein
   the position information obtaining section determines the safety area, based on a history of a plurality of pieces of position information that have been obtained.

4. The information communication terminal according to claim 1, wherein
   when the position information obtaining section has failed to obtain the position information of the information communication terminal, the safety determination section determines that the security risk during communication is high.

5. An information communication terminal configured to perform wireless communication using short distance communication, comprising:
   a position information obtaining section configured to obtain position information of the information communication terminal;
   a safety area storing section configured to store a safety area registered as being safe when the information communication terminal performs communication with another terminal;
   a safety determination section configured to determine, based on the position information of the information communication terminal and the safety area, a security risk at the time when the information communication terminal performs communication with the another terminal; and
   a communication section configured to perform, when the safety determination section has determined that the security risk during communication is high, data communication with the another terminal at a predetermined smaller radio wave intensity, and perform, when the safety determination section has determined that the security risk during communication is low, data communication with the another terminal at a predetermined larger radio wave intensity,
   wherein the communication section obtains position information of the another terminal, and the safety determination section determines, further based on the position information of the another terminal, the security risk at the time when the information communication terminal performs communication with the another terminal.

6. The information communication terminal according to claim 5, wherein
at a timing when the distance between the information communication terminal and the another terminal has become a distance that allows communication at a radio wave intensity determined based on the determination by the safety determination section, the communication section starts data communication.

7. A communication system including a first and a second information communication terminals that each perform wireless communication using short distance communication,
the first information communication terminal comprising:
a position information obtaining section configured to obtain position information of the first information communication terminal;
a safety area storing section configured to store a safety area registered as being safe when the first information communication terminal performs communication with the second information communication terminal;
a safety determination section configured to determine, based on the position information and the safety area, a security risk at the time when the first information communication terminal performs communication with the second information communication terminal; and
a communication section configured to perform, when the safety determination section has determined that the security risk during communication is high, data communication with the second information communication terminal at a predetermined smaller radio wave intensity, and perform, when the safety determination section has determined that the security risk during communication is low, data communication with the second information communication terminal at a predetermined larger radio wave intensity,
wherein the safety determination section determines the security risk during communication, depending on whether a current position of the first information communication terminal obtained from the position information is present within the safety area, and
the safety determination section determines the security risk during communication, further based on information obtainment time obtained from the position information.

8. A communication method performed by an information communication terminal configured to perform wireless communication using short distance communication, the method comprising the steps of:
obtaining position information of the information communication terminal;
determining, based on the position information and a safety area registered as being safe when the information communication terminal performs communication with another terminal, the safety area being stored in advance, a security risk at the time when the information communication terminal performs communication with the another terminal; and
performing, when it is determined that the security risk during communication is high in the determining step, data communication with the another terminal at a predetermined smaller radio wave intensity, and performing, when it is determined that the security risk during communication is low in the determining step, data communication with the another terminal at a predetermined larger radio wave intensity,
wherein, in the determining step, the security risk during communication is determined (i) depending on whether a current position of the information communication terminal obtained from the position information is present within the safety area, and (ii) further based on information obtainment time obtained from the position information.

9. A communication system including a first and a second information communication terminals that each perform wireless communication using short distance communication,
the first information communication terminal comprising:
a position information obtaining section configured to obtain position information of the first information communication terminal;
a safety area storing section configured to store a safety area registered as being safe when the first information communication terminal performs communication with the second information communication terminal;
a safety determination section configured to determine, based on the position information and the safety area, a security risk at the time when the first information communication terminal performs communication with the second information communication terminal; and
a communication section configured to perform, when the safety determination section has determined that the security risk during communication is high, data communication with the second information communication terminal at a predetermined smaller radio wave intensity, and perform, when the safety determination section has determined that the security risk during communication is low, data communication with the second information communication terminal at a predetermined larger radio wave intensity,
wherein the communication section obtains position information of the second information communication terminal, and
the safety determination section determines, further based on the position information of the second information communication terminal, the security risk at the time when the first information communication terminal performs communication with the second information communication terminal.

10. A communication method performed by an information communication terminal configured to perform wireless communication using short distance communication, the method comprising the steps of:
obtaining position information of the information communication terminal;
determining, based on the position information and a safety area registered as being safe when the information communication terminal performs communication with another terminal, the safety area being stored in advance, a security risk at the time when the information communication terminal performs communication with the another terminal;
performing, when it is determined that the security risk during communication is high in the determining step, data communication with the another terminal at a predetermined smaller radio wave intensity, and performing, when it is determined that the security risk during communication is low in the determining step, data communication with the another terminal at a predetermined larger radio wave intensity; and obtaining position information of the another terminal, wherein in the determining step, the security risk at the time when the information communication terminal performs communication with the another terminal is determined further based on the position information of the another terminal.

* * * * *